US010288099B2

(12) United States Patent
Soni Gutierrez et al.

(10) Patent No.: US 10,288,099 B2
(45) Date of Patent: May 14, 2019

(54) ATTACHMENT FEATURE FOR SECURING TWO PARALLEL WORKPIECES TOGETHER

(71) Applicant: FORD GLOBAL TECHNOLOGIES, LLC, Dearborn, MI (US)

(72) Inventors: Luis Humberto Soni Gutierrez, Mexico City (MX); Francisco Ronquillo Melendez, Puebla (MX); Jose Manuel Guzman Colin, Cuautitlan Izcalli (MX); Enrique Granell Peniche, Naucalpan de Juarez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 14/959,343

(22) Filed: Dec. 4, 2015

(65) Prior Publication Data

US 2017/0159688 A1   Jun. 8, 2017

(51) Int. Cl.
| | |
|---|---|
| *F16B 5/12* | (2006.01) |
| *F16B 5/06* | (2006.01) |
| *F16B 21/08* | (2006.01) |
| *F16B 21/07* | (2006.01) |

(52) U.S. Cl.
CPC ............ *F16B 5/123* (2013.01); *F16B 5/0642* (2013.01); *F16B 5/0664* (2013.01); *F16B 5/12* (2013.01); *F16B 21/075* (2013.01); *F16B 21/086* (2013.01); *F16B 21/088* (2013.01)

(58) Field of Classification Search
CPC ...... F16B 5/0642; F16B 5/0664; F16B 5/123; F16B 19/00; F16B 21/075; F16B 21/086; F16B 21/088; F16B 5/12
USPC .......................................... 411/508, 509, 510
See application file for complete search history.

(56) References Cited

U.S. PATENT DOCUMENTS

| | | | | | |
|---|---|---|---|---|---|
| 2,141,700 | A | * | 12/1938 | Tinnerman | B60R 13/02 220/DIG. 3 |
| 4,712,341 | A | * | 12/1987 | Harris, Jr. | B60J 1/005 24/297 |
| 4,865,505 | A | * | 9/1989 | Okada | B60N 3/046 24/293 |
| 4,924,561 | A | * | 5/1990 | Yoneyama | F16B 5/0642 24/297 |
| 4,981,405 | A | * | 1/1991 | Kato | F16B 21/02 24/297 |
| 5,484,175 | A | * | 1/1996 | Teich | E05B 9/08 292/198 |
| 5,597,280 | A | * | 1/1997 | Stern | F16B 2/08 24/453 |
| 6,074,150 | A | | 6/2000 | Shinozaki et al. | |
| 6,481,682 | B2 | | 11/2002 | Miura | |
| 8,109,569 | B2 | | 2/2012 | Mitchell | |
| 8,851,565 | B2 | | 10/2014 | Hontz et al. | |

(Continued)

*Primary Examiner* — Roberta S Delisle
(74) *Attorney, Agent, or Firm* — Vichit Chea; King & Schickli, PLLC

(57) ABSTRACT

An attachment feature is provided for securing two workpieces together. That attachment feature includes a first wall, a second wall, and a cantilever snap extending between the two walls. Further, the attachment feature includes a first lateral rib projecting from the first wall and a second lateral rib projecting from the second wall. A workpiece assembly is also provided.

16 Claims, 8 Drawing Sheets

(56) References Cited

U.S. PATENT DOCUMENTS

| | | | |
|---|---|---|---|
| 8,870,131 B2* | 10/2014 | Gotou | F16B 21/086 174/480 |
| 2004/0238203 A1* | 12/2004 | Arai | F16B 21/086 174/135 |
| 2005/0105987 A1 | 5/2005 | Giugliano et al. | |
| 2006/0214468 A1 | 9/2006 | Cass et al. | |
| 2007/0065256 A1* | 3/2007 | Wakabayashi | F16B 21/088 411/502 |
| 2008/0169388 A1* | 7/2008 | Torigoe | F16B 5/065 248/158 |
| 2009/0205174 A1* | 8/2009 | Slobodecki | B60R 13/0206 24/458 |

* cited by examiner

ATTACHMENT FEATURE FOR SECURING TWO PARALLEL WORKPIECES TOGETHER

TECHNICAL FIELD

This document relates generally to the fastening field and, more particularly, to an attachment feature for securing two parallel workpieces together as well as to a workpiece assembly comprising two attached workpieces including an integral attachment feature in one workpiece and a cooperating window in another workpiece.

BACKGROUND

When attaching two parallel parts or workpieces it is difficult to guarantee restriction in all directions and rotations. In the past, it is has generally been necessary to use separate fasteners or features that increase the complexity and the manufacturing cost of the resulting workpiece assembly.

This document relates to a new and improved attachment feature for securing two parallel workpieces together while providing positive retention of the workpieces together in the X, Y, and Z directions. Further, this document relates to a new and improved workpiece assembly wherein the first workpiece includes an integral attachment feature that is inserted into and secured within a cooperating window provided in the second workpiece. Advantageously, no separate parts or fasteners are required in order to complete the connection.

SUMMARY

In accordance with the purposes and benefits described herein, an attachment feature is provided for securing two workpieces together. That attachment feature comprises a first wall, a second wall, and a cantilever snap extending between the first and second walls. Further, the attachment feature includes a first lateral rib projecting from the first wall and a second lateral rib projecting from the second wall. The first and second lateral ribs may be opposed to one another.

The first wall may have a first tapered end while the second wall may have a second tapered end. A bridge connects the first and second tapered ends together. The cantilevered snap depends from the bridge.

In one possible embodiment the first wall and the second wall converge in a direction toward the first tapered end and the second tapered end.

In one possible embodiment a connecting wall is provided between the first wall and the second wall. The connecting wall is spaced from the cantilevered snap. Further, the connecting wall may include at least one tuning rib projecting therefrom.

In accordance with yet another aspect, a workpiece assembly is provided. That workpiece assembly comprises a first workpiece including an integral attachment feature and a second workpiece including a window for receiving and holding the integral attachment feature when the first and second workpieces are connected together. As noted above, that attachment feature has a first wall, a second wall, a cantilever snap extending between the first and second walls, a first lateral rib projecting from the first wall and a second lateral rib projecting from the second wall.

In one possible embodiment, the first lateral rib is opposed to the second lateral rib. In one possible embodiment, the first wall has a first tapered end and the second wall has a second tapered end. A bridge connects the two tapered ends. The cantilevered snap may depend from that bridge.

In one possible embodiment, the first wall and the second wall converge in a direction toward the tapered ends.

In one possible embodiment, a connecting wall is provided between the first wall and the second wall. The connecting wall is spaced from the cantilevered snap. At least one tuning rib may project from the connecting wall. Further, that at least one tuning rib may include a sloped cam surface.

In accordance with still another aspect, a method is provided for connecting two parallel workpieces. That method may be broadly described as comprising the steps of providing an integral attachment feature on a first workpiece, providing a window in a second workpiece and connecting the first workpiece to the second workpiece by inserting the integral attachment feature into the window.

The method may further include the step of securing the attachment feature in the window by means of the cantilevered snap. Further, the method may include positively retaining the first workpiece and the second workpiece together in an X-direction by means of the cantilevered snap, positively retaining the first workpiece and the second workpiece together in a Z-direction by means of opposed sidewalls of the attachment feature and positively retaining the first workpiece and the second workpiece together in a Y-direction by means of opposed lateral ribs of the attachment feature.

Still further, the method may include the step of engaging a first set of opposed margins of the window with the opposed sidewalls and engaging a second set of opposed margins of the window with the opposed lateral ribs.

In the following description, there are shown and described several preferred embodiments of the attachment feature and the workpiece assembly. As it should be realized, the attachment feature and workpiece assembly are capable of other, different embodiments and their several details are capable of modification in various, obvious aspects all without departing from the attachment feature and workpiece assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the attachment feature and workpiece assembly and together with the description serve to explain certain principles thereof. In the drawing figures.

Reference will now be made in detail to the present preferred embodiments of the attachment feature and workpiece assembly, examples of which are illustrated in the accompanying drawing figures.

DETAILED DESCRIPTION

Figure 1:
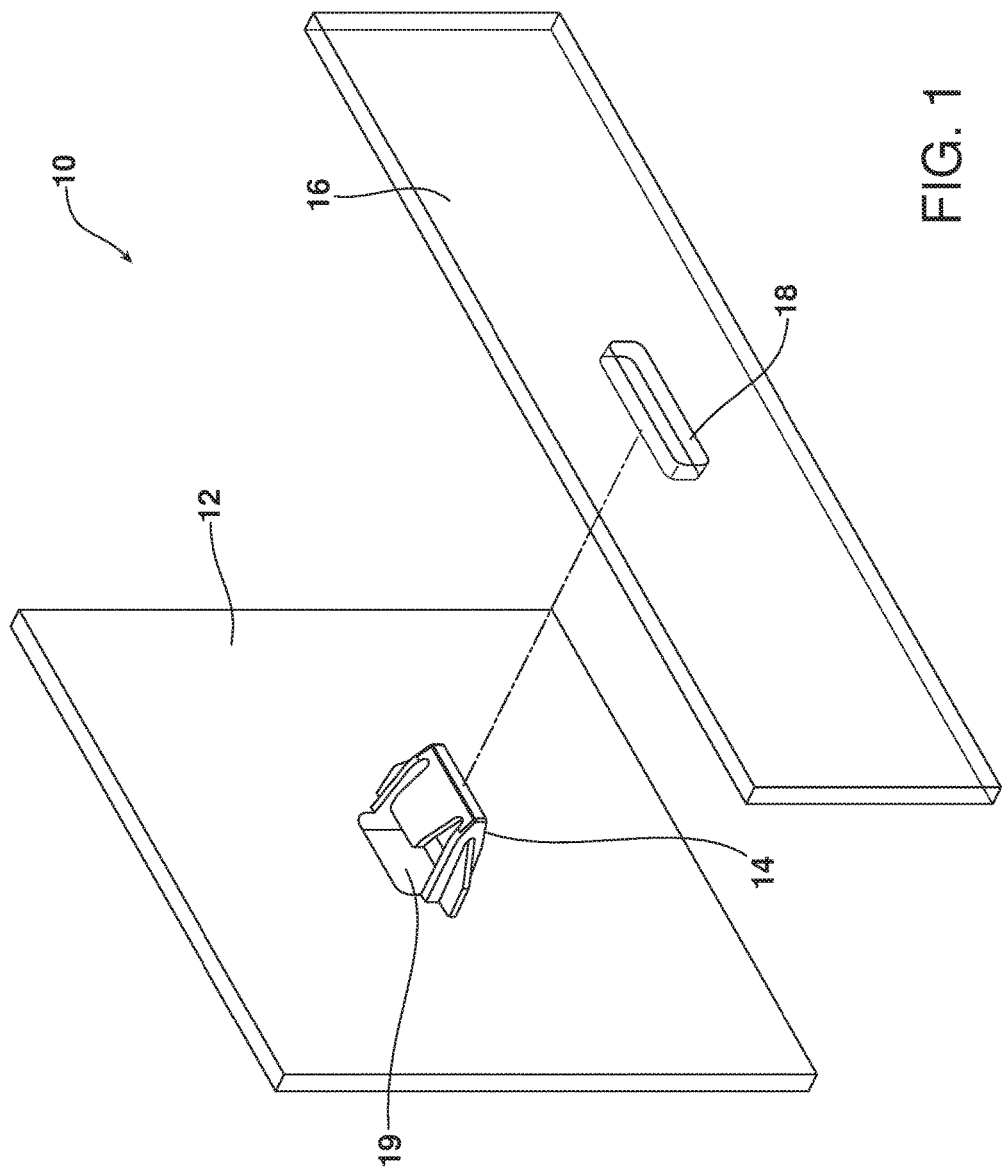
FIG. 1 is an exploded perspective view of the workpiece assembly clearly illustrating the first workpiece including an integral attachment feature and the second workpiece including a window.
Figure 2:
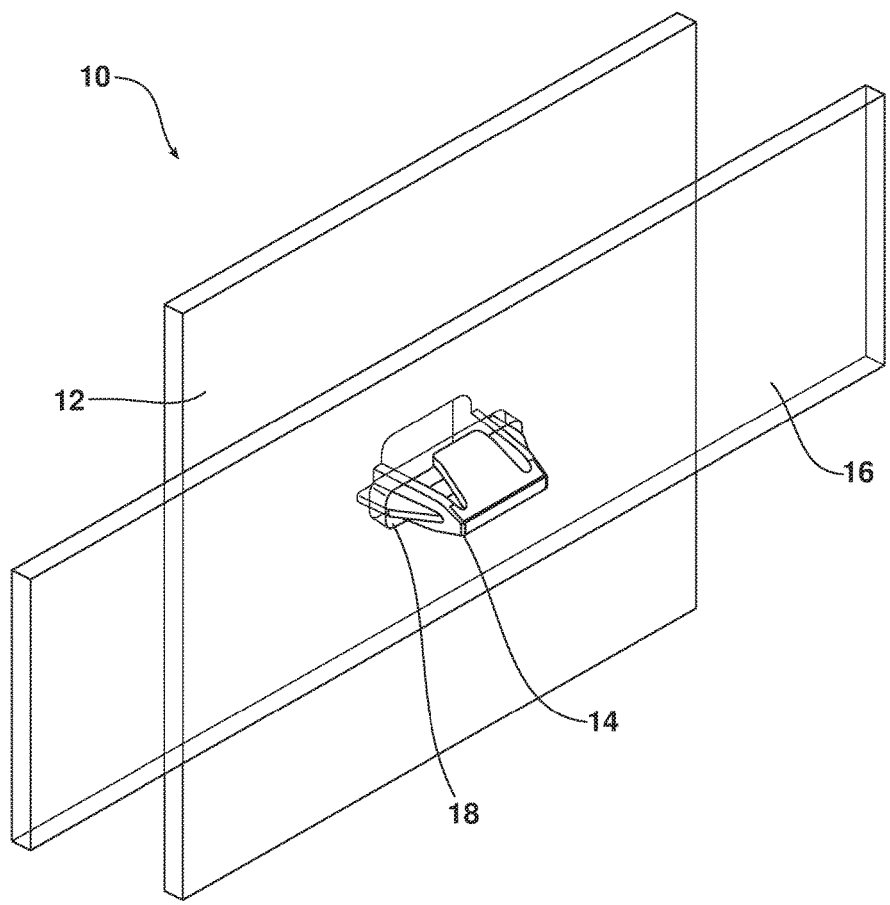
FIG. 2 is a perspective view illustrating the assembled workpiece assembly wherein the attachment feature on the first workpiece is inserted into and extends through the window in the second workpiece.

Reference is now made to FIGS. 1 and 2 illustrating a workpiece assembly 10 comprising a first workpiece 12 including an integral attachment feature 14 and a second workpiece 16 including a window 18. As illustrated in FIG. 2, the workpiece assembly 10 is assembled by inserting the integral attachment feature 14 on the first workpiece 12 into the window 18 on the second workpiece 16. As will be described in greater detail below, the integral attachment feature 14 functions to secure the two parallel workpieces 12, 16 together by providing positive retention in the X, Y and Z directions.

As illustrated, the workpiece 12 includes a hole 19 that allows the molding of the attachment feature 14 on the workpiece 12 without any additional actions on the mold. This makes it easier and less expensive to produce.

Figure 3:
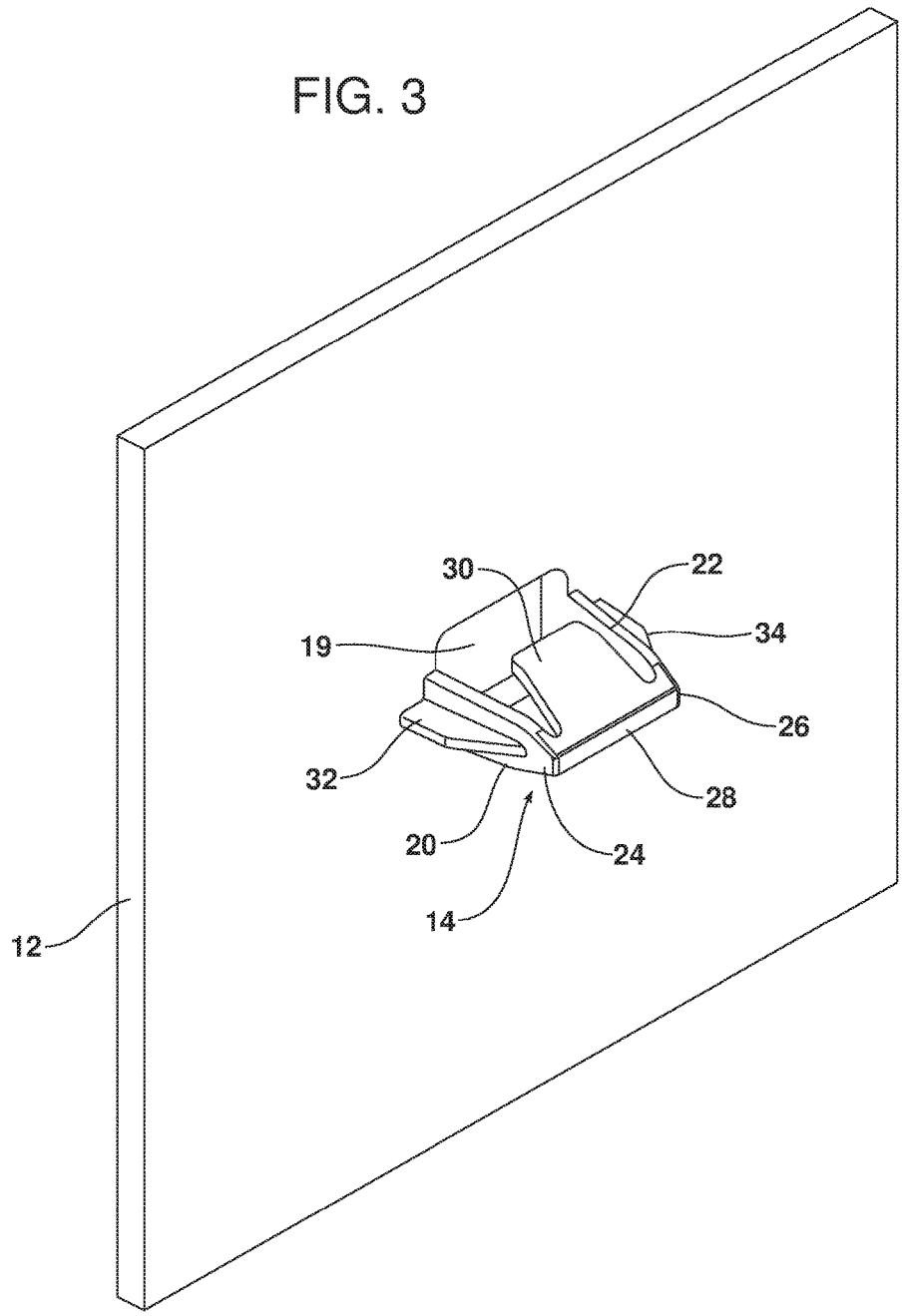
FIG. 3 is a detailed perspective view of the attachment feature integrally molded with the first workpiece.
Figure 4:
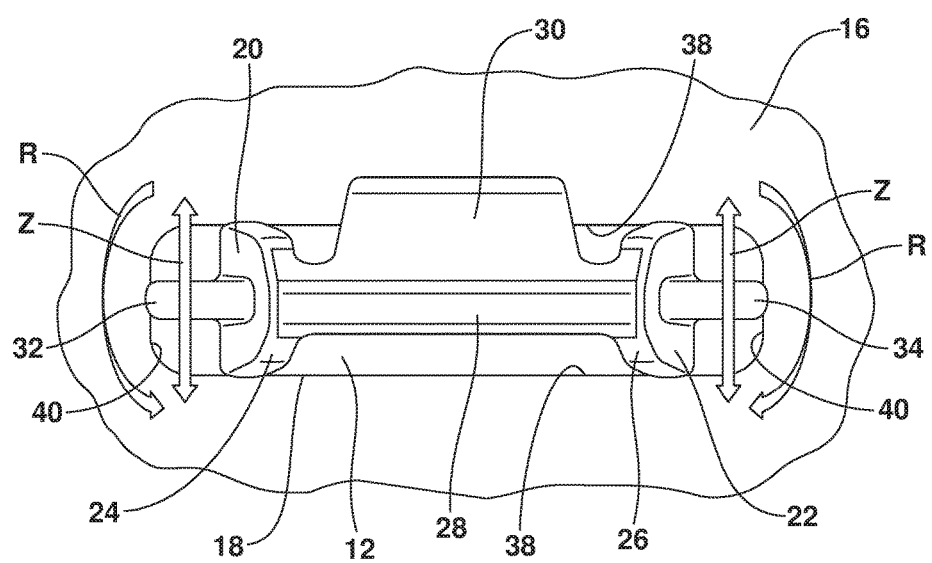
FIG. 4 is a detailed front elevational view illustrating the connection of the attachment feature on the first workpiece in the window of the second workpiece and showing the opposed walls of that attachment feature positively retaining the two workpieces together in the Z-direction by means of the opposed sidewalls of the attachment feature.
Figure 5:
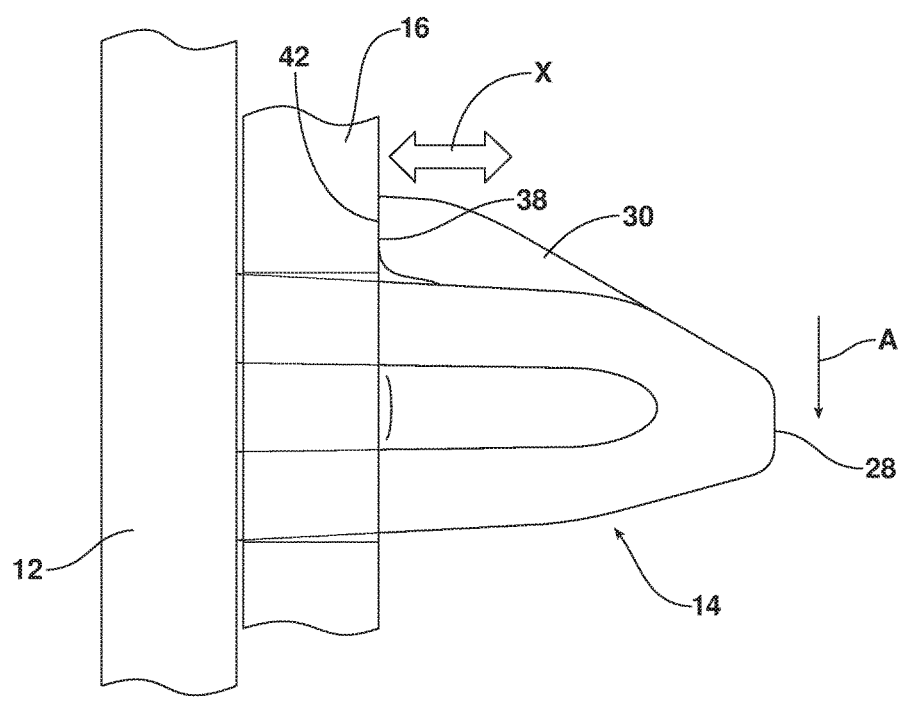
FIG. 5 is a detailed end view illustrating how the cantilever snap of the attachment feature functions to retain the two workpieces together in the X-direction.
Figure 6:
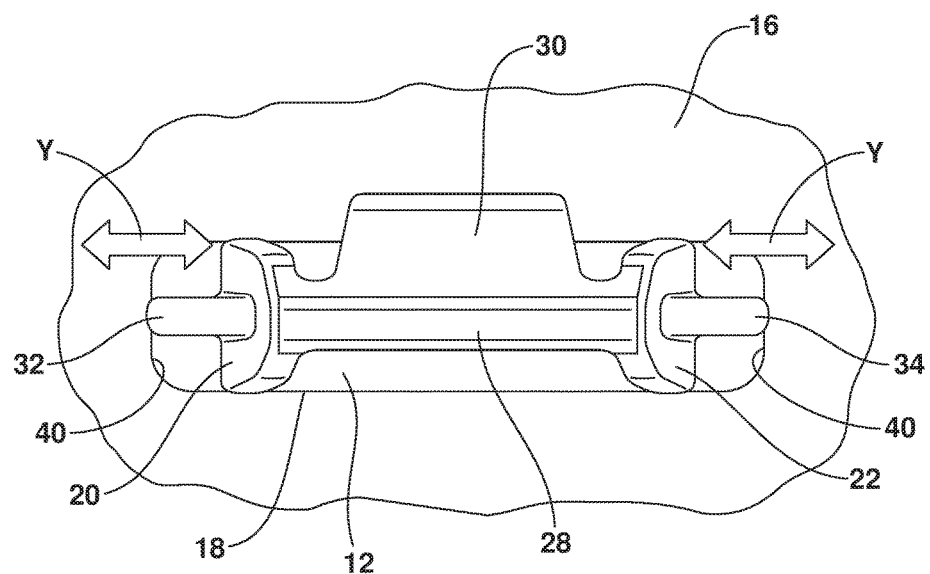
FIG. 6 is a detailed front elevational view illustrating how the opposed lateral ribs of the attachment feature positively retain the two workpieces together in the Y-direction.

Reference is now made to FIG. 3, which illustrates the integral attachment feature 14 in detail, and FIGS. 4-6 which illustrate how the attachment feature is received in the window 18 to provide positive retention and connection of the two workpieces 12, 16 in the X, Y and Z directions.

As shown, the attachment feature 14 includes a first wall 20 and a second wall 22. The first wall 20 has a first tapered end 24 while the second wall 22 has a second tapered end 26.

As illustrated, the first wall 20 and the second wall 22 converge in a direction toward the first and second tapered ends 24, 26. In one possible embodiment, the converging walls 20, 22 define an included angle of between about 45 and about 90 degrees. A bridge 28 connects the first tapered end 24 to the second tapered end 26. A cantilever snap 30 depends from the bridge 28 and extends between the first and second walls 20, 22, finally overlying them in profile (see also FIG. 5).

A first lateral rib 32 projects outboard from the first wall 20. A second lateral rib 34 projects outboard from the second wall 22. As best illustrated in FIGS. 4 and 6, the two lateral ribs 32, 34 are opposed to one another.

Reference is now made to FIGS. 4-6 illustrating the orientation of the integral attachment feature 14 of the first workpiece 12 when that attachment feature is inserted in the window 18 in the second workpiece 16 in order to secure the workpiece assembly 10 together. As illustrated, the tapered ends 24, 26 of the first and second walls 20, 22 and the tapered leading edges 36 of the two lateral ribs 32, 24 function to align and center the attachment feature 14 in the window 18. The overall height of the tapered walls 20, 22 at their highest point slightly exceeds the overall height of the window 18 so as to provide an interference fit between the walls 20, 22 of the attachment feature and the first opposed margins 38 of the second workpiece 16 defining the height of the window 18.

Similarly, the overall width defined by the tapering lateral ribs 32, 34 of the attachment feature 14 at their widest point slightly exceeds the overall width of the window 18 defined between the second opposed margins 40 of the second workpiece 16 defining the width of the window 18. As should be appreciated from reviewing FIG. 4, the engagement of the opposed upper lower edges of the walls 20, 22 with the lower margin 38 of the windows 18 provides positive retention of the integral attachment feature 14 in the window 18 and the first workpiece 12 with respect to the second workpiece 16 in the Z-direction (note action arrow in FIG. 4). Similarly, the engagement of the outer edges of the lateral ribs 32, 34 with the opposed margins 40 of the second workpiece 16 defining the width of the window 18 provides positive retention of the integral attachment feature 14 within the window 18 and the first workpiece 12 with respect to the second workpiece 16 in the Y-direction. Note action arrows Y in FIG. 6.

As the integral attachment feature 14 is inserted in the window 18, the cantilever snap 30 bends downwardly in the direction of action arrow A (see FIG. 5) in order to provide clearance to slide through the window. When the integral attachment feature 14 is fully seated in the window 18 and the tapered walls 20, 22 are providing a tight interference fit with the margins 38 while the lateral ribs 32, 34 are providing a tight interference fit with the margins 40, the cantilever snap 30 has just cleared the second workpiece 16. In this position the resilient cantilever snap 30 returns to its home position wherein the end 42 of the cantilever snap 30 abuts against the upper margin 38 of the second workpiece 16 thereby providing positive retention of the attachment feature 14 in the window 18 and the first workpiece 12 with respect to the second workpiece 16 in the X-direction (note action arrow X in FIG. 5).

From the above, it should be appreciated that the tapered walls 20, 22, the tapered lateral ribs 32, 34 and the cantilever snap 30 all function together to provide a secure and stable connection between the two workpieces 12, 16 of the workpiece assembly 10. More specifically, these features provide a positive retention force to resist play, rotation (note action arrows R in FIG. 4) and movement in the X, Y and Z directions.

Figure 7A:
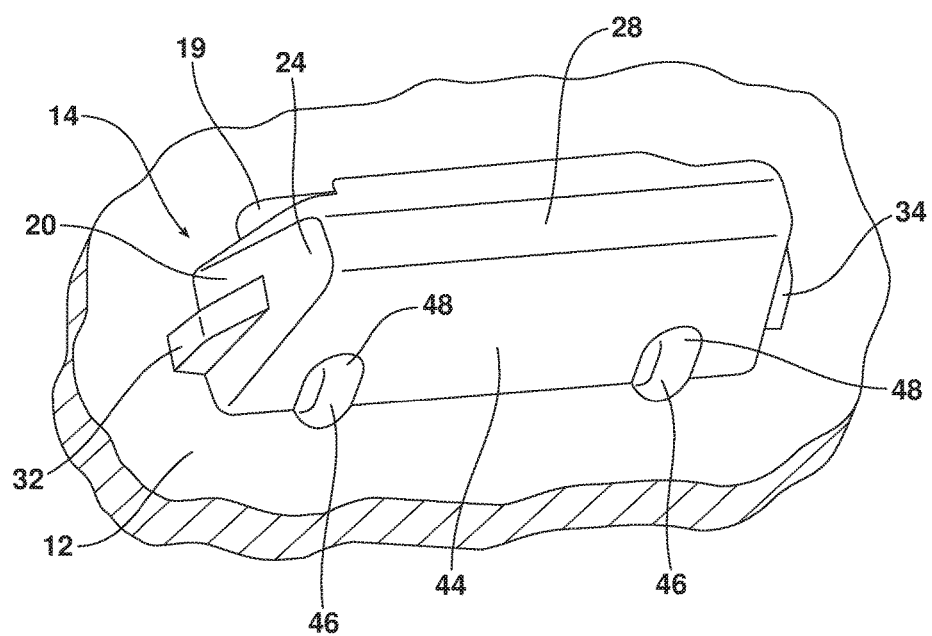
FIGS. 7A and 7B are respective bottom perspective and end perspective views of an alternative embodiment of an attachment feature including a connecting wall that extends between the first and second walls of the attachment feature and includes one or more tuning ribs.
Figure 7B:
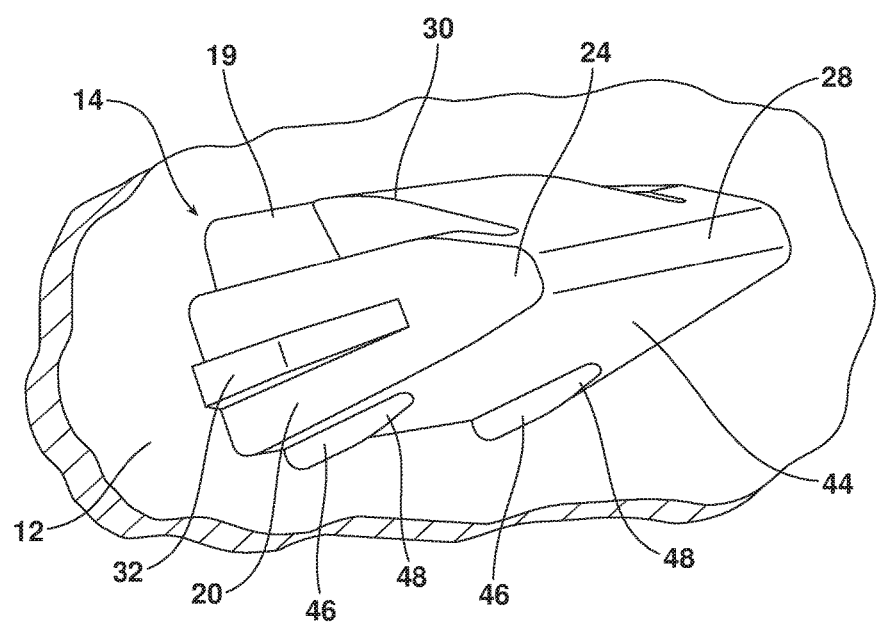

Reference is now made to FIGS. 7A and 7B illustrating an alternative embodiment of integral attachment feature 14. This embodiment shares all the structural features identified above with respect to the first embodiment illustrated in FIGS. 1-6 and those features are identified by the same reference numbers for clarity and brevity. In addition, the alternative embodiment of the attachment feature 14 illustrated in FIGS. 7A and 7B includes a connecting wall 44 extending between the first and second walls 20, 22 along a bottom side of the attachment feature opposite the cantilever snap 30 at the topside thereof. In the illustrated embodiment, the connecting wall 44 also extends from the bridge 28.

At least one tuning rib 46 may project downwardly from the bottom face of the connecting wall 44 away from the resilient cantilever snap 30. In the illustrated embodiment, two such tuning ribs 46 are shown. It should be appreciated that substantially any number of tuning ribs 46 may be provided as desired for any application. Each tuning rib 46 may include a sloped cam surface 48 to aid in inserting and securing the attachment feature 14 in the window 18. Advantageously, the tuning rib(s) 46 may compensate for production tolerances to ensure proper connection. Further, the tuning ribs 46 provide force concentration points for better interference fit and a more secure connection.

As should be appreciated, any of the embodiments of the integral attachment feature 14 are useful in a method of connecting two parallel workpieces 12, 16 together. That method may be described as including the steps of: (a) providing the integral attachment feature 14 on a first workpiece 12, (b) providing a window 18 in a second workpiece 16, and (c) connecting the first workpiece to the second workpiece by inserting the integral attachment feature into the window. That method may further include the step of securing the attachment feature 14 in the window 18 by means of a cantilever snap 30.

Further the method may include positively retaining the first workpiece 12 and the second workpiece 16 together in an X-direction by means of the cantilever snap 30, positively retaining the two workpieces together in a Z-direction by means of the opposed sidewalls 20, 22 of the attachment feature 14 and positively retaining the workpieces together in a Y-direction by means of the opposed lateral ribs 32, 34. Still further, the method may include the step of engaging a first set of opposed window margins 38 with the opposed sidewalls 20, 22 and engaging a second set of opposed window margins 40 with the opposed lateral ribs 32, 34.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An attachment feature for securing two workpieces together, comprising:
    a first wall having a first tapered end;
    a second wall having a second tapered end;
    a bridge connecting the first tapered end to the second tapered end;
    a cantilever snap extending between said first wall and said second wall;
    a first lateral rib projecting from said first wall; and
    a second lateral rib projecting from said second wall.

2. The attachment feature of claim 1, wherein said first lateral rib is opposed to said second lateral rib.

3. The attachment feature of claim 2, wherein said cantilevered snap depends from said bridge.

4. The attachment feature of claim 3, wherein said first wall and said second wall converge in a direction toward said first tapered end and said second tapered end.

5. The attachment feature of claim 4, further including a connecting wall between said first wall and said second wall, said connecting wall being spaced from said cantilevered snap.

6. The attachment feature of claim 5, further including at least one tuning rib projecting from said connecting wall.

7. A workpiece assembly, comprising:
    a first workpiece including an integral attachment feature having a first wall with a tapered first end, a second wall with a tapered second end, a bridge connecting said first tapered end to said second tapered end, a cantilever snap extending between said first wall and said second wall, a first lateral rib projecting from said first wall and a second lateral rib projecting from said second wall; and
    a second workpiece including a window receiving and holding said integral attachment feature when said first workpiece and said second workpiece are connected together.

8. The workpiece assembly of claim 7, wherein said first workpiece extends in a first plane and said second workpiece extends in a second plane wherein said first plane and said second plane are parallel.

9. The workpiece assembly of claim 8, wherein said first lateral rib is opposed to said second lateral rib.

10. The workpiece assembly of claim 9, wherein said cantilevered snap depends from said bridge.

11. The workpiece assembly of claim 10, wherein said first wall and said second wall converge in a direction toward said first tapered end and said second tapered end.

12. The workpiece assembly of claim 11, further including a connecting wall between said first wall and said second wall, said connecting wall being spaced from said cantilevered snap.

13. The workpiece assembly of claim 12, further including at least one tuning rib projecting from said connecting wall.

14. The workpiece assembly of claim 13, wherein said at least one tuning rib includes a sloped cam surface.

15. A method of connecting two parallel workpieces, comprising:
    providing an integral attachment feature on a first workpiece;
    providing a window in a second workpiece;
    connecting said first workpiece to said second workpiece by inserting said integral attachment feature into said window;
    securing said attachment feature in said window by means of a cantilever snap; and
    positively retaining said first workpiece and said second workpiece together in an X-direction by means of said cantilever snap, positively retaining said first workpiece and said second workpiece together in a Z-direction by means of opposed sidewalls of said attachment feature and positively retaining said first workpiece and said second workpiece together in a Y-direction by means of opposed lateral ribs of said attachment feature.

16. The method of claim 15, including engaging a first set of opposed margins of said window with said opposed sidewalls and engaging a second set of opposed margins of said window with said opposed lateral ribs.

* * * * *